(12) United States Patent
Kamatani et al.

(10) Patent No.: US 8,077,209 B2
(45) Date of Patent: Dec. 13, 2011

(54) IMAGING PREVENTING APPARATUS AND IMAGING PREVENTING METHOD

(75) Inventors: Yoshiteru Kamatani, Kanagawa (JP); Nozomu Ozaki, Kanagawa (JP); Masamichi Asukai, Kanagawa (JP); Taiji Ito, Kanagawa (JP); Akinobu Sugino, Kanagawa (JP); Hidehiko Sekizawa, Tokyo (JP); Akane Sano, Tokyo (JP); Hirotaka Sakaguchi, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 460 days.

(21) Appl. No.: 12/152,927

(22) Filed: May 19, 2008

(65) Prior Publication Data

US 2009/0033756 A1 Feb. 5, 2009

(30) Foreign Application Priority Data

May 23, 2007 (JP) .................................. 2007-136842

(51) Int. Cl.
*H04N 7/18* (2006.01)
*H04N 5/228* (2006.01)
(52) U.S. Cl. .................................. 348/208.14; 348/161
(58) Field of Classification Search .................. None
See application file for complete search history.

(56) References Cited

U.S. PATENT DOCUMENTS

2005/0277428 A1* 12/2005 Nathan Brown ............ 455/456.3
2007/0103552 A1* 5/2007 Patel et al. ..................... 348/203

FOREIGN PATENT DOCUMENTS

| JP | 2001-313006 A | 11/2001 |
| JP | 2002-122678 A | 4/2002 |
| JP | 2005-223601 A | 8/2005 |
| JP | 2006-284643 A | 10/2006 |
| JP | 2006-301417 A | 11/2006 |

* cited by examiner

*Primary Examiner* — Lin Ye
*Assistant Examiner* — Euel Cowan
(74) *Attorney, Agent, or Firm* — Wolf, Greenfield & Sacks, P.C.

(57) ABSTRACT

An imaging preventing apparatus includes imaging means for obtaining an imaged image signal by performing imaging processing, image analyzing means for performing image analyzing processing on the imaged image signal obtained by the imaging means, imaging preventing operation performing means for performing a preventing operation against imaging by a different camera system, and control means for determining the possibility of being imaged by a different camera system based on the analysis result information by the image analyzing means and, if it is determined that there is a possibility of being imaged, causing the imaging preventing operation performing means to perform the preventing operation.

11 Claims, 5 Drawing Sheets

FIG. 3A  FIG. 3B  FIG. 3C  FIG. 3D
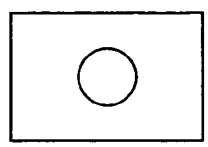 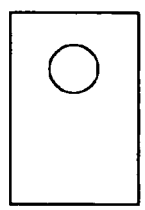 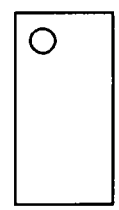 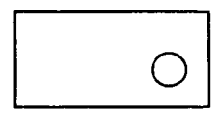
FIG. 4
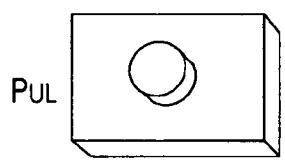 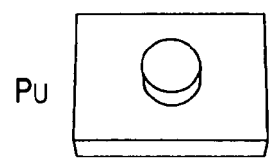 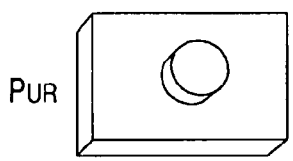
 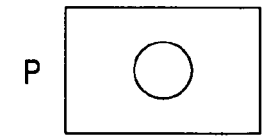 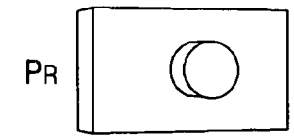
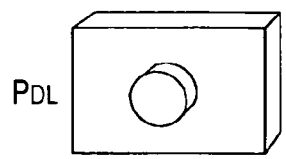 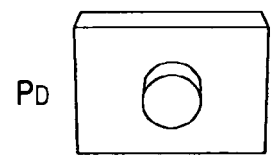 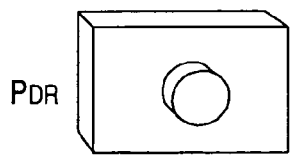

IMAGING PREVENTING APPARATUS AND IMAGING PREVENTING METHOD

CROSS REFERENCES TO RELATED APPLICATIONS

The present invention contains subject matter related to Japanese Patent Application JP 2007-136842 filed in the Japanese Patent Office on May 23, 2007, the entire contents of which being incorporated herein by reference.

BACKGROUND OF THE INVENTION

1. Field of the Invention

The present invention relates to an imaging preventing apparatus and an imaging preventing method and, in particular, it relates to a technology that allows the prevention of imaging without permission, such as pirating.

2. Description of the Related Art

With the significantly wide spread of imaging apparatus such as video cameras and digital still cameras, the reduction of the size of the apparatus has been fostered. In this situation, the acts of invasions of personal privacy and/or the right of publicity by easy imaging have been concerned.

Particularly, there are situations where images, which have been imaged without permission, are published on Internet websites, and serious problems have been caused by imaging without permission.

Many people do not like being imaged without permission, but a small-scale system that controls imaging based on the intension of a subject has not been developed yet.

For that reason, it is being considered that so-called pirating, for example, may be prevented by using a technology as proposed in JP-A-2005-223601 (Patent Document 1).

The technology in Patent Document 1 embeds specific pattern information and/or an IC tag in a subject, the imaging of which is not desired, such as a picture and a book in advance. A camera side recognizes the specific pattern information or IC tag information and is forcibly limited in (or prohibited against) the imaging. By not embedding such specific pattern information or an IC tag in a subject, which does not prohibit against imaging particularly, a camera can recognize that the subject does not have any specific pattern information or IC tag information and can perform imaging thereon.

Thus, the damage can be avoided from so-called "digital shoplifting" of a subject the imaging of which is not desired while imaging a subject, which is allowed to image, can be permitted freely.

SUMMARY OF THE INVENTION

However, the technology of embedding an item such as an IC tag as described above is not effective in a case where a person desires to prevent the imaging of himself/herself.

Furthermore, since it is important for a camera side to perform imaging prohibition control, the imaging prohibiting function is not provided in a case where a camera in the past, which has been already available, is used.

Accordingly, it is desirable to implement an imaging preventing apparatus that can prevent indiscriminate imaging such as pirating even in a case where a camera in the past is used.

According to an embodiment of the invention, there is provided an imaging preventing apparatus including imaging means for obtaining an imaged image signal by performing imaging processing, image analyzing means for performing image analyzing processing on the imaged image signal obtained by the imaging means, imaging preventing operation performing means for performing a preventing operation against imaging by a different camera system, and control means for determining the possibility of being imaged by a different camera system based on the analysis result information by the image analyzing means and, if it is determined that there is a possibility of being imaged, causing the imaging preventing operation performing means to perform the preventing operation.

The image analyzing means may perform image analysis on whether the imaged image signal contains at least an image of a lens of a camera system or not.

The control means may determine the presence of the possibility of being imaged by a different camera system based on the information on whether an image of the different camera system exists within the imaged image signal or not as the analysis result information from the image analyzing means.

The control means may determine the presence of the possibility of being imaged by a different camera system by using, as the analysis result information from the image analyzing means, information on whether an image of the different camera system exists within the imaged image signal or not and information on the direction of imaging of the different camera system.

The imaging preventing operation performing means may perform a light emitting operation as the preventing operation.

The imaging preventing operation performing means may have a light emitting unit and a movable mechanism that allows the direction of light irradiation by the light emitting unit to move. In this case, the control means may cause the light emitting unit to perform light emission output as the preventing operation and causes the movable mechanism to perform a tracking operation such that the output light can aim to the different camera system.

The imaging preventing operation performing means may perform an operation of outputting unnecessary emission as the preventing operation.

The imaging preventing operation performing means may output a control signal to disable an imaging function of the different camera system as the preventing operation.

According to another embodiment of the invention, there is provided an imaging preventing method including the steps of obtaining an imaged image signal by performing imaging processing, performing image analyzing processing on the imaged image signal, determining the presence of a possibility of being imaged by a different camera system based on analysis result information of the image analyzing processing, and performing an imaging preventing operation based on the result of the determination that there is a possibility of being imaged by a different camera system.

According to the embodiments of the invention, an imaging preventing apparatus worn by a person, for example, can recognize a camera system directing toward himself/herself (that is, the wearing person) and perform an operation of preventing imaging by the camera system. In other words, the imaging preventing apparatus recognizes the presence of a different camera system by performing imaging. If a situation is determined that there is a possibility of being imaged by a different camera system, an imaging preventing operation is performed which prevents the different camera system from performing proper imaging.

The imaging preventing operation may include performing flash light emission or laser light emission to be so-called backlighted to the different camera system and prevent proper imaging of a person wearing the imaging preventing apparatus. The imaging preventing operation may further include giving unnecessary emission or a control signal to a different camera system so as to prevent an imaging device unit and/or an imaging control system of the different camera system from properly operating.

According to the embodiments of the invention, the use of the imaging prevention apparatus by a person can prevent a situation where the person is imaged without permission by a different camera system.

Thus, it can be avoided that your face or body is imaged indiscriminately and used without permission, invading privacy and right of publicity.

Since light emission or unnecessary emission output is performed as the imaging preventing operation, the imaging prevention effect can be exhibited to most camera systems including cameras in the past.

BRIEF DESCRIPTION OF THE DRAWINGS

FIGS. 3A to 3D are explanatory diagrams of form patterns of camera recognition according to an embodiment of the invention;

FIG. 4 is an explanatory diagram of displacements in angle for camera recognition according to an embodiment of the invention;

DESCRIPTION OF THE PREFERRED EMBODIMENTS

Embodiments of the invention will be described below in the following order:
[1. Configuration Example of Imaging Preventing Apparatus]
[2. Imaging Preventing Processing Example]
[3. Examples of Other Imaging Preventing Operations]
[4. Effects of Embodiments and Variation Examples]
[1. Configuration Example of Imaging Preventing Apparatus]

Figure 1:
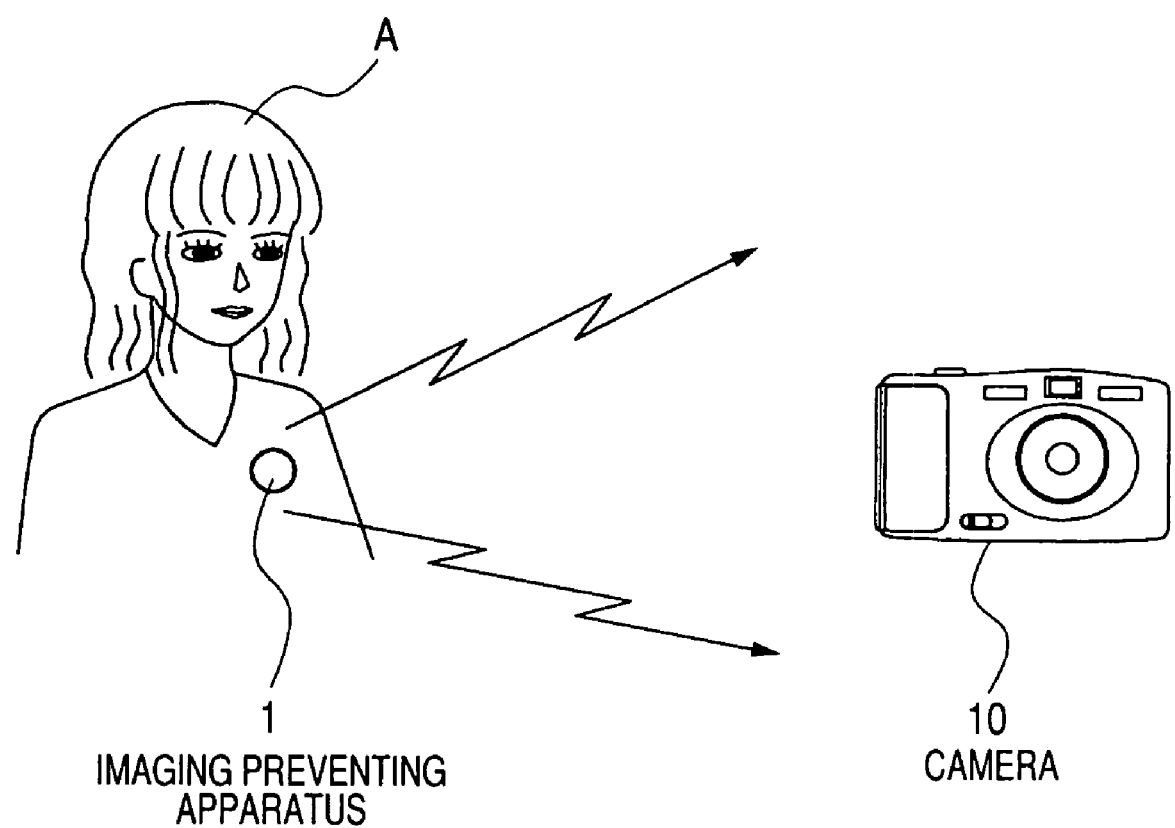
FIG. 1 is an explanatory diagram of the outline of an embodiment of the invention.

As an imaging preventing apparatus 1 according to an embodiment of the invention, FIG. 1 shows a budge type imaging preventing apparatus 1.

The imaging preventing apparatus 1 has a structure which is attachable to user's clothing by a user who does not desire to be imaged indiscriminately, for example. The imaging preventing apparatus 1 may be attached to the chest by a user A as shown in FIG. 1, for example. As will be described later, the imaging preventing apparatus 1 is not limited to a budge type, apparently.

The imaging preventing apparatus 1 performs flash light emission as a preventing operation for preventing imaging with a camera 10 when imaging is being attempted by another person with the camera 10. For example, the fact that the direction of imaging of the camera 10 directs to the imaging preventing apparatus 1 (that is, the user A wearing the imaging preventing apparatus 1) may be detected, and the flash light emission may be performed automatically. The flash light emission may be performed by a manual operation by the user A.

The user A captured as a subject may be backlighted with respect to the camera 10 by continuously performing the flash light emission, for example, when the camera 10 aims thereat. Thus, proper imaging of the user A can be prevented, and pirating, for example, can be prevented as a result.

The imaging preventing operation may be other operations than the flash light emitting operation, which will be described later.

Figure 2A:
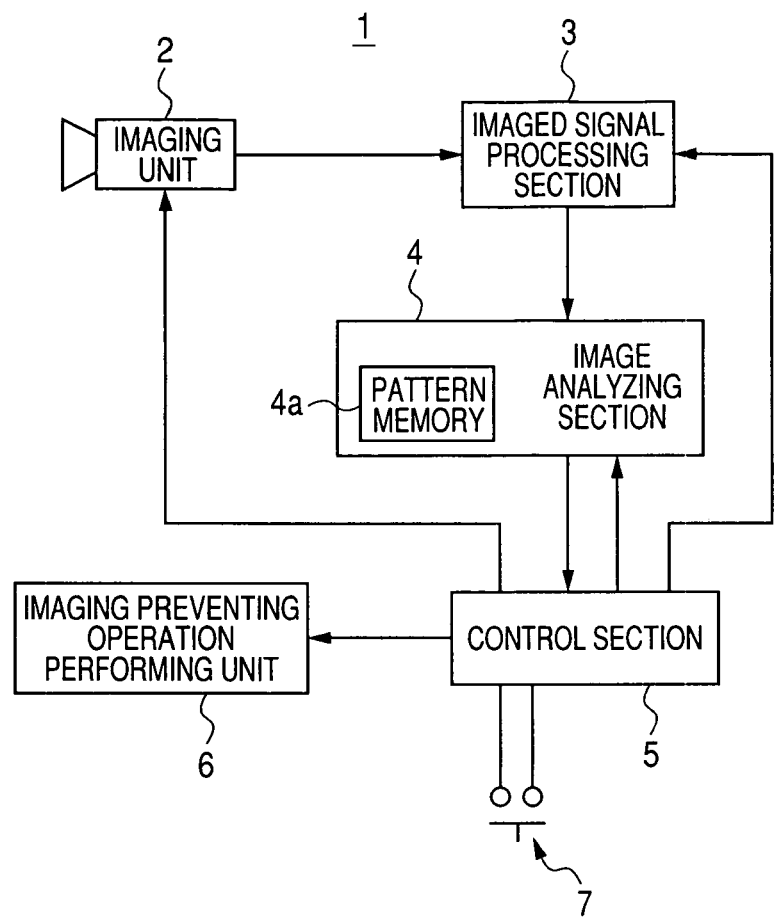
FIGS. 2A and 2B are explanatory diagrams of configurations of an imaging preventing apparatus according to an embodiment of the invention.
Figure 2B:
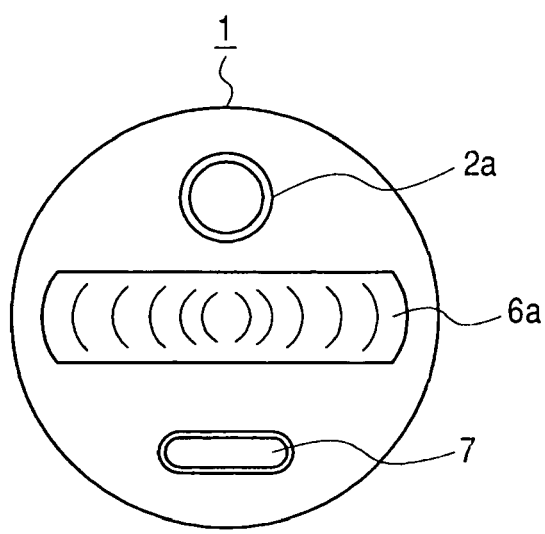

FIGS. 2A and 2B show a configuration example of the imaging preventing apparatus 1. FIG. 2A shows the internal configuration of the imaging preventing apparatus 1, and FIG. 2B shows the front structure example of the budge type imaging preventing apparatus 1, for example.

As shown in FIG. 2B, the front side of the imaging preventing apparatus 1 has an imaging lens 2a, a flash light emitting unit 6a and a preventing operation instructing switch 7.

The back face of the imaging preventing apparatus 1 has an attachment mechanism, not shown, for attaching the imaging preventing apparatus 1 to clothing by a user.

The internal configuration of the imaging preventing apparatus 1 includes an imaging unit 2, an imaged signal processing section 3, an image analyzing section 4, a control section 5 and an imaging preventing operation performing section 6, as shown in FIG. 2A.

The control section 5 may include, for example, a microcomputer having a CPU (Central Processing Unit), a ROM (Read Only Memory), a RAM (Random Access Memory), a non-volatile memory unit, and an interface unit. The control section 5 performs operational processing and/or operational control over those components based on programs held in the internal ROM, for example. Particularly, the control section 5 performs operational processing by using analysis result information from the image analyzing section 4 and performs operational control over the imaging preventing operation performing section 6.

The operational information of the preventing operation instructing switch 7 shown in FIG. 2B is supplied to the control section 5, and the control section 5 also controls the imaging preventing operation performing unit 6 to perform an imaging preventing operation in response to an operation on the preventing operation instructing switch 7.

The imaging unit 2 has an imaging optical system, an imaging device unit, a timing generator and an analog front end.

The imaging optical system in the imaging unit 2 may include a lens system having an imaging lens 2a shown in FIG. 2B, an aperture and a focus lens and a driving system for causing the lens system to perform a focus operation, for example.

The imaging device unit in the imaging unit 2 has a solid-state imaging device array that detects imaged light obtained by the imaging optical system and generates an imaged signal by performing photoelectric conversion on the detected imaged light. The solid-state imaging device array may be a CCD (Charge Coupled Device) sensor array or a CMOS (Complementary Metal Oxide Semiconductor) sensor array, for example.

The analog front end in the imaging unit 2 has a sample hold/AGC (Automatic Gain Control) circuit that performs gain control and/or waveform shaping on a signal obtained by the solid-state imaging device, a gain amplifier for adjusting the sensitivity and a video A/D converter and outputs imaged image data as digital data.

The timing generator in the imaging unit 2 generates shutter pulses to the solid-state imaging device or sampling pulses to be used in the analog front end.

The imaged signal processing section 3 performs various digital signal processings on imaged image data obtained by the imaging unit 2. The imaged signal processing section 3 may perform white balance processing, intensity processing, color signal processing and/or a fluctuation correction processing, for example, on imaged image data.

The imaged signal processing section 3 supplies the imaged image data, which have undergone various processings, to the image analyzing section 4.

The image analyzing section 4 performs image analyzing processing on the supplied imaged image data. Particularly, the image analyzing section 4 analyzes whether the imaged image data contains an image of a different camera 10. Furthermore, if there is an image of the different camera 10, the image analyzing section 4 analyzes the angle information as the direction of imaging by the camera 10.

The image analyzing section 4 is configurable as a microcomputer or an image processing DSP (Digital Signal Processor), for example. Here, the microcomputer functioning as the control section 5 may include the function as the image analyzing section 4 though the image analyzing section 4 and the control section 5 are shown in separate blocks.

The image analyzing section 4 detects the presence of an external camera 10 by performing image pattern matching within the supplied imaged image data.

For example, in a case where a user A wears the imaging preventing apparatus 1, as shown in FIG. 1A and a camera 10 attempts capturing the user A as a subject, the imaged image data imaged by the imaging section 2 contains the image of the camera 10 photographed from the substantially front direction.

For that reason, the image analyzing section 4 stores form patterns of various cameras, which are viewed from the front direction. For example, the image analyzing section 4 stores imaginable form patterns of various types of camera (such as a digital still camera, a video camera and a silver salt camera) and models. The image analyzing section 4 stores form pattern data of camera cabinets and lenses in advance, here. Apparently, the examples shown in FIGS. 3A to 3D is a part of the form pattern, and more form patterns from which a camera can be inferred are desirably stored.

For example, not only machines such as a digital still camera and a video camera but also machines such as a cellular phone, a PDA (Personal Digital Assistant), and a portable personal computer with a function as an imaging apparatus are preferably recognized as an external camera 10. Therefore, form patterns of those machines may be stored preferably to use for determination.

The imaging analysis is performed on every one frame of the imaged image data, which is supplied from the imaged signal processing section 3 at all times, and whether an image corresponding to form patterns as shown in FIGS. 3A to 3D is contained therein or not is determined. Then, if an image corresponding to a form pattern is contained therein, it is determined that the camera 10 of another person exists who has a possibility of aiming at a user A as a subject.

However, in reality, it is important to recognize a form pattern in consideration of a displacement from a plane with the direction of imaging (lens optical axis) of the imaging unit 2 as the normal. In other words, the camera 10 of another person is not always positioned to the front.

As examples of the form pattern as shown in FIG. 3A, form patterns PU, PD, PL, PR, PUL, PUR, PDL and PDR as shown in FIG. 4 with respect to the front pattern P can also be inferred as a form of the camera 10 aiming at the user A as a subject.

Since it is important to consider the case where these patterns are recognized, the image analyzing section 4 determines that there is a camera 10 of another person having a possibility of aiming at a user A as a subject also in a case where a camera form resulting from slight displacement of the direction of imaging is recognized instead of the front form within the imaged image data.

Then, the image analyzing section 4 further detects a displacement in angle of the direction of imaging on a camera image contained in the imaged image data with reference to the direction of imaging with a user A (that is, the imaging preventing apparatus 1) at the front. In other words, the image analyzing section 4 analyzes the form pattern of a camera, calculates horizontally and vertically displaced angles from the state that the detected camera aims itself (imaging preventing apparatus 1) as a subject based on the contour form of the cabinet or the lens form, which is recognized within the imaged image data and supplies the information of displaced angles to the control section 5.

The control section 5 determines whether a user A is currently being aimed as a subject or not based on the information on whether a camera exists within imaged image data or not and if the control unit 5 recognizes that the camera exists, the information on the angle of the direction of imaging (displaced angle with reference to the optical axis of itself) within the imaged image data of the camera from the image analyzing section 4.

Notably, it is important to properly define threshold values of the angle range for determining that a camera is "directing to itself" and the angle and larger for determining that a camera is "not directing to itself" about horizontally and vertically displaced angles.

The imaging preventing operation performing unit 6 includes the flash light emitting unit 6a as shown in FIG. 2B and a light emission driving circuit. The imaging preventing operation performing unit 6 performs flash light emission under the emission control of the control section 5.

[2. Imaging Preventing Processing Example]

Figure 5:
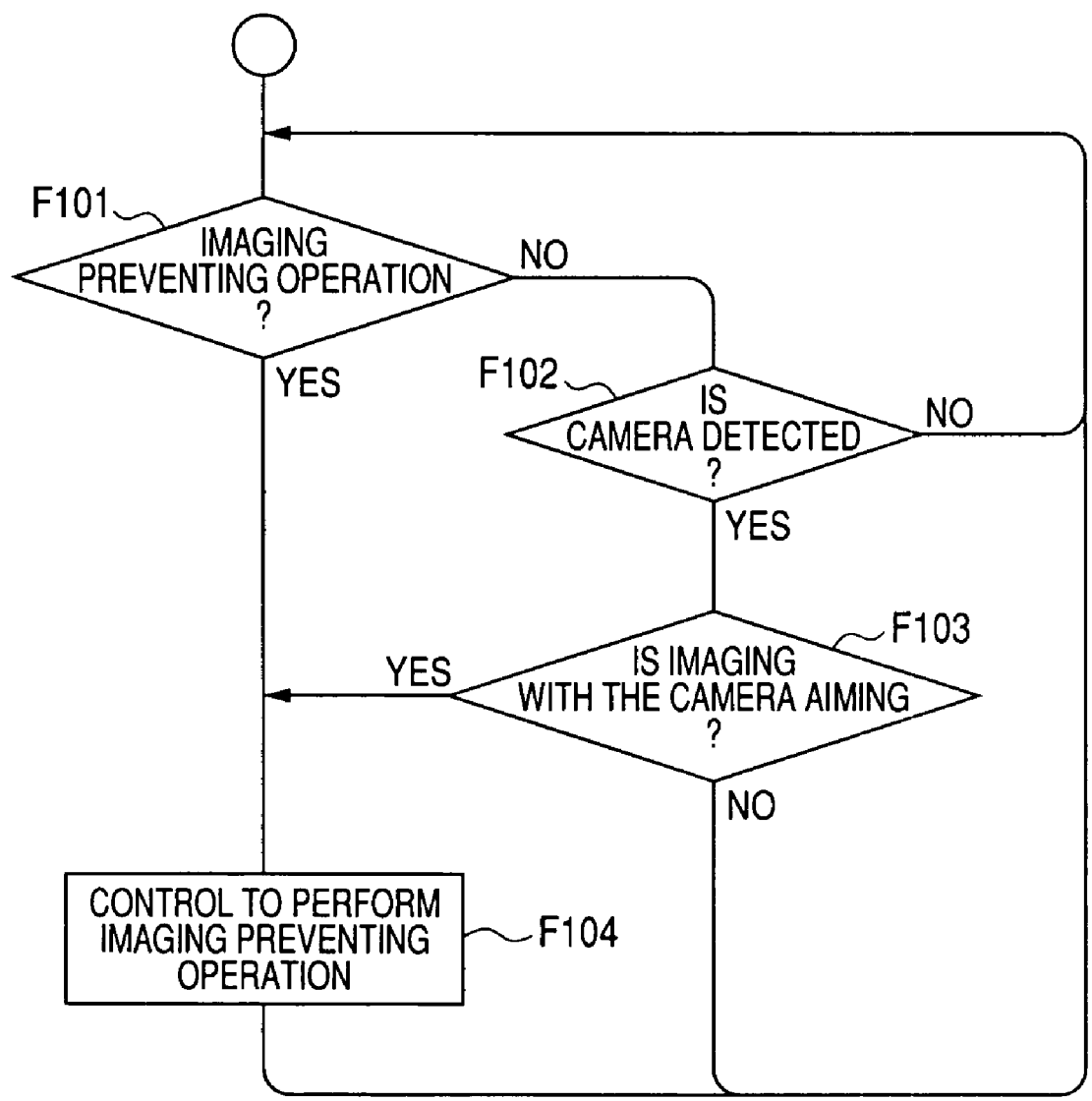
FIG. 5 is a flowchart of imaging preventing processing according to an embodiment of the invention.

FIG. 5 shows an example of the imaging preventing processing by the imaging preventing apparatus 1. FIG. 5 shows processing by the control section 5.

In step F101, the control section 5 detects whether the preventing operation instructing switch 7 has been pressed or not. In step F102, the analysis result information from the image analyzing section 4 is captured, and whether the presence of an external camera 10 has been recognized within the imaged image data or not is determined.

If the analysis result is obtained in which the external camera 10 exists in the substantially front direction in step F102, the processing moves to step F103 where the direction of imaging by the external camera 10 is determined, and whether the camera is aiming at the imaging preventing apparatus 1 or not is determined. This may be determined based on whether the information on a displaced angle of the camera recognized within the imaged image data as described above is equal to or smaller than the threshold angle.

The control section 5 performs the processing above at all times and moves to step F104 if the fact that the user A has pressed the preventing operation instructing switch 7 and it is determined in step F103 that the external camera 10 directs the direction of imaging to the imaging preventing apparatus 1. In step F104, the control section 5 controls the performance of the imaging preventing operation. That is, the control section 5 instructs the imaging preventing operation performing unit 6 to perform flash light emission.

The continuation of the processing in FIG. 5 keeps performing the flash light emission while the user A is pressing the preventing operation instructing switch 7 and while it is being determined that the external camera 10 is aiming at the imaging preventing apparatus 1 as the direction of imaging based on the image analysis result.

Therefore, the user A is backlighted by the flash light emission with respect to the camera 10, which prevents the user A's face and/or body from being clearly imaged if the user A notices the possibility of being pirated and presses the preventing operation instructing switch 7 by himself/herself or if the control section 5 determines that there is a possibility of pirating based on the analysis result by the image analyzing section 4 even when the user A does not notice the possibility.

The user A himself/herself can also be notified the existence of the camera 10 by the flash light emission performed as a result of the determination based on the image analysis result even if the user A does not notice it. Therefore, the user A can recognize the existence of the camera 10 directing to himself/herself even in a case the user A has not noticed it and can counter the imaging with the camera 10.

[3. Examples of Other Imaging Preventing Operations]

Having described that the flash light emission is performed as the imaging preventing operation in the example above, other examples of the imaging preventing operation can be considered.

First, the imaging preventing operation performing unit 6 may be provided as a unit generating radio wave or electromagnetic wave noise as unnecessary emission.

For example, in order to prevent the imaging with a wireless camera, the imaging can be virtually disabled by continuously transmitting different signals over transmission frequency bands such as the 0.9 GHz band, 1.2 GHz band and 2.4 GHz band.

Alternatively, unnecessary emissions may be caused, which causes surges in the driving circuit for an imaging device unit (such as a CCD sensor and a CMOS sensor) of the camera 10. Alternatively, surges may be caused in trigger signals for imaging.

Assuming that the camera 10 is a machine subject to imaging prohibiting processing according to a specific control signal, a control signal for imaging prohibition can be transmitted to the camera 10.

An operation may be considered that emits laser light to an external camera 10. In this case, the imaging preventing apparatus 1 is configured as shown in FIG. 6.

Figure 6:
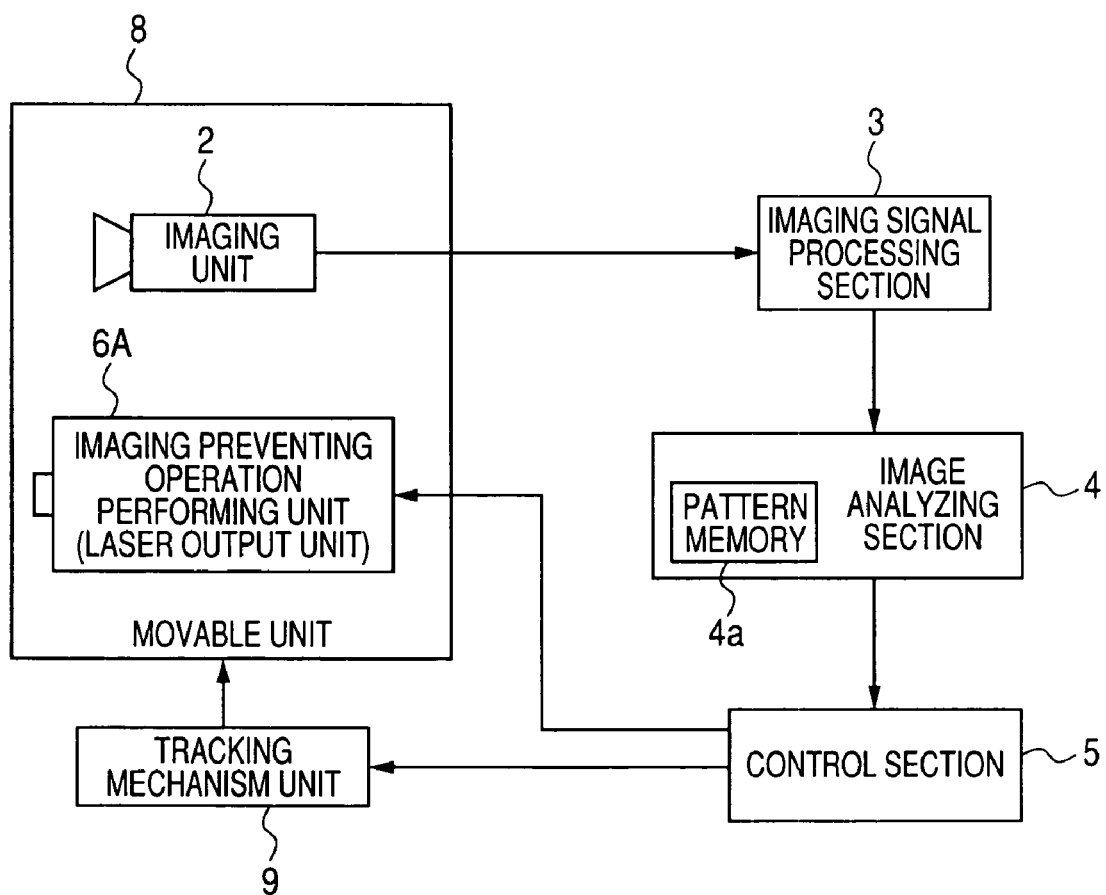
FIG. 6 is a block diagram of another-configuration example of an imaging preventing apparatus according to an embodiment of the invention.

In FIG. 6, the same reference numerals are given to those in FIG. 2A, and the repetitive descriptions will be omitted herein. In the configuration in FIG. 6, the imaging preventing operation performing unit 6A is a laser output unit having a laser diode and a laser driving circuit.

Then, an imaging preventing operation performing unit 6A and the imaging unit 2 are provided in a movable unit 8 that can move in the panning direction and tilting direction. The movable unit 8 is driven in the panning direction or tilting direction by a tracking mechanism unit 9.

The control section 5 determines the possibility of imaging with a camera 10, like the case in FIG. 2B, based on the analysis result by the image analyzing section 4 and performs tracking control based on the image analysis result.

In other words, the image analyzing section 4 transmits information on the direction of movement and the amount of movement to the control section 5 as information on the movement of the camera 10, which is recognized with the imaged image data of sequentially supplied frames.

In a case where the control section 5 determines that there is a possibility of being subject, the control section 5 instructs an imaging preventing operation performing unit 6A to perform laser output and controls the tracking mechanism unit 9 based on the information on the movement of the camera 10 from the image analyzing section 4. Thus, the movable unit 8 is driven to have the direction of laser output tracking the external camera 10.

Therefore, the directional light such as laser light can aim at the external camera 10 so that the imaging device unit of the camera 10 is exposed to the laser light. As a result, the backlighted state can be created, and clear imaging can be prevented.

[4. Effects of Embodiments and Variation Examples]

According to the embodiments above, the user A can use the imaging preventing apparatus 1 to prevent the situation that the user A is imaged with the camera 10 by another person without permission. Thus, things can be avoided that his/her face and/or body are imaged indiscriminately and are used without permission, invading privacy or the right of publicity.

The imaging preventing operation may be performed automatically based on the image analysis result or may be performed manually. Performing the imaging preventing operation automatically based on the image analysis result allows the imaging preventing function to be exhibited well even in a case where the user A does not notice the situation that there is a possibility of pirating.

In a case where the user A notices that the camera 10 is aiming at himself/herself, the imaging preventing operation can be performed manually. The pirating can be prevented effectively by performing the imaging preventing operation automatically/manually.

The imaging preventing operation may be flash light emission, tracking laser light emission or unnecessary emission output such that the imaging preventing effect can be exhibited to most camera systems including cameras in the past.

The invention is not limited to the embodiments, but various variation examples may be considered as the configuration and operation examples of the imaging preventing apparatus 1.

First, having described that the imaging preventing apparatus 1 has a budge shape and is wearable by a person on clothing, the form of the imaging preventing apparatus 1 may vary.

For example, the imaging preventing apparatus 1 may be provided in a hairpin shape, a hair accessory shape, an earring shape, a necklace shape, a brooch shape, a bracelet shape, a wristwatch shape, an eyeglasses shape, a necktie pin shape, an arm band shape or a ring shape, for example. A user can wear it in the way corresponding to the shape.

The imaging preventing apparatus 1 may be configured to be attachable to existing eye glasses, sunglasses, an accessory, a cap or a hat, a headphone or the like.

In other words, the form of the imaging preventing apparatus 1 is not limited at all, but it is important to have a shape wearable by a person.

The imaging preventing apparatus 1 may be provided as a camera system owned by a user. Conversely, the functions of the imaging preventing apparatus 1 may be embedded in a camera system.

For example, in a case of a camera system, the imaging section 2 and the imaged signal processing section 3 in FIG. 2A already exist, and the flash light emitting unit may be often provided. Thus, it can be relatively easily implemented that analysis processing is performed on the imaged image data obtained by the imaged signal processing section 3 to perform flashlight emission for preventing imaging based on the analysis result.

The imaging preventing apparatus 1 may be attached to an item instead of a person. For example, in a case where the prohibition of unlimited imaging is desired for a work of art such as a picture and a craft object, a jacket for software such as music and a movie, a book, a poster or a photograph, for example, the imaging preventing apparatus 1 may be attached to the item. Alternatively, those items may internally contain the imaging preventing apparatus 1.

Thus, the imaging prevention can be implemented for not only a person but also publications or goods for sale, for example.

Having described that the image analyzing section 4 detects the existence of a different camera 10 by comparing the form patterns of the forms of the cabinet and the lens, the image analyzing section 4 may recognize the lens part only, for example.

For example, if the imaged image data internally has a circular and transparent part, it can be recognized as a lens of a camera, and the existence of a camera 10 can be determined.

Having described in the processing example in FIG. 5 that the imaging preventing operation is performed in a case where the existence of a camera 10 is recognized and in a case where it is determined that the imaging by the camera 10 is aiming at itself, a processing example may be considered that performs the imaging preventing operation if the existence of the camera 10 is only recognized.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging preventing apparatus comprising:
   imaging means for obtaining an imaged image signal by performing imaging processing;
   image analyzing means for performing image analyzing processing on the imaged image signal obtained by the imaging means, said image analyzing processing comprising comparing the imaged image signal to a form pattern of a camera;
   imaging preventing operation performing means for performing a preventing operation against imaging by the camera; and
   control means for determining a possibility of imaging by the camera based at least in part on analysis result information by the image analyzing means and, if it is determined that there is a possibility of being imaged, causing the imaging preventing operation performing means to perform the preventing operation.

2. The imaging preventing apparatus according to claim 1, wherein the image analyzing means performs image analysis on whether the imaged image signal comprises an image of a lens of the camera.

3. The imaging preventing apparatus according to claim 1, wherein the control means determines the possibility of imaging by the camera based at least in part on information on whether an image of the camera exists within the imaged image signal or not as the analysis result information from the image analyzing means.

4. The imaging preventing apparatus according to claim 1, wherein the control means determines the possibility of being imaged imaging by the camera by using, as the analysis result information from the image analyzing means, information on whether an image of the camera exists within the imaged image signal and information on the direction of imaging of the camera.

5. The imaging preventing apparatus according to claim 1, wherein the imaging preventing operation performing means performs a light emitting operation as the preventing operation.

6. The imaging preventing apparatus according to claim 1, the imaging preventing operation performing means having:
   a light emitting unit; and
   a movable mechanism that allows a direction of light irradiation by the light emitting unit to vary,
   wherein the control means causes the light emitting unit to output light as the preventing operation and causes the movable mechanism to perform a tracking operation such that the output light can aim at the camera.

7. The imaging preventing apparatus according to claim 1, wherein the imaging preventing operation performing means performs an operation of outputting unnecessary emission as the preventing operation.

8. The imaging preventing apparatus according to claim wherein the imaging preventing operation performing means outputs a control signal to disable an imaging function of the camera as the preventing operation.

9. An imaging preventing method comprising:
   obtaining an imaged image signal by performing imaging processing;
   performing image analyzing processing on the imaged image signal, said image analyzing processing comprising comparing the imaged image signal to a form pattern of a camera;
   determining of a possibility of imaging by the camera based on analysis result information of the image analyzing processing; and
   performing an imaging preventing operation based on a result of the determining of the possibility of imaging by the camera.

10. An imaging preventing apparatus comprising:
    an imaging unit to obtain an imaged image signal by performing imaging processing;
    an image analyzing unit to perform image analyzing processing on the imaged image signal obtained by the imaging unit, said image analyzing processing comprising comparing the imaged image signal to a form pattern of a camera;
    an imaging preventing operation performing unit to perform a preventing operation against imaging by the camera; and
    a control unit to determine the possibility of imaging by the camera based at least in part on analysis result information by the image analyzing unit and, if it is determined that there is a possibility of being imaged, causing the imaging preventing operation performing unit to perform the preventing operation.

11. The imaging preventing apparatus of claim 1, wherein the image analyzing processing further comprises analyzing the imaged image signal to determine movement of a camera.

* * * * *